United States Patent Office 3,457,685
Patented July 29, 1969

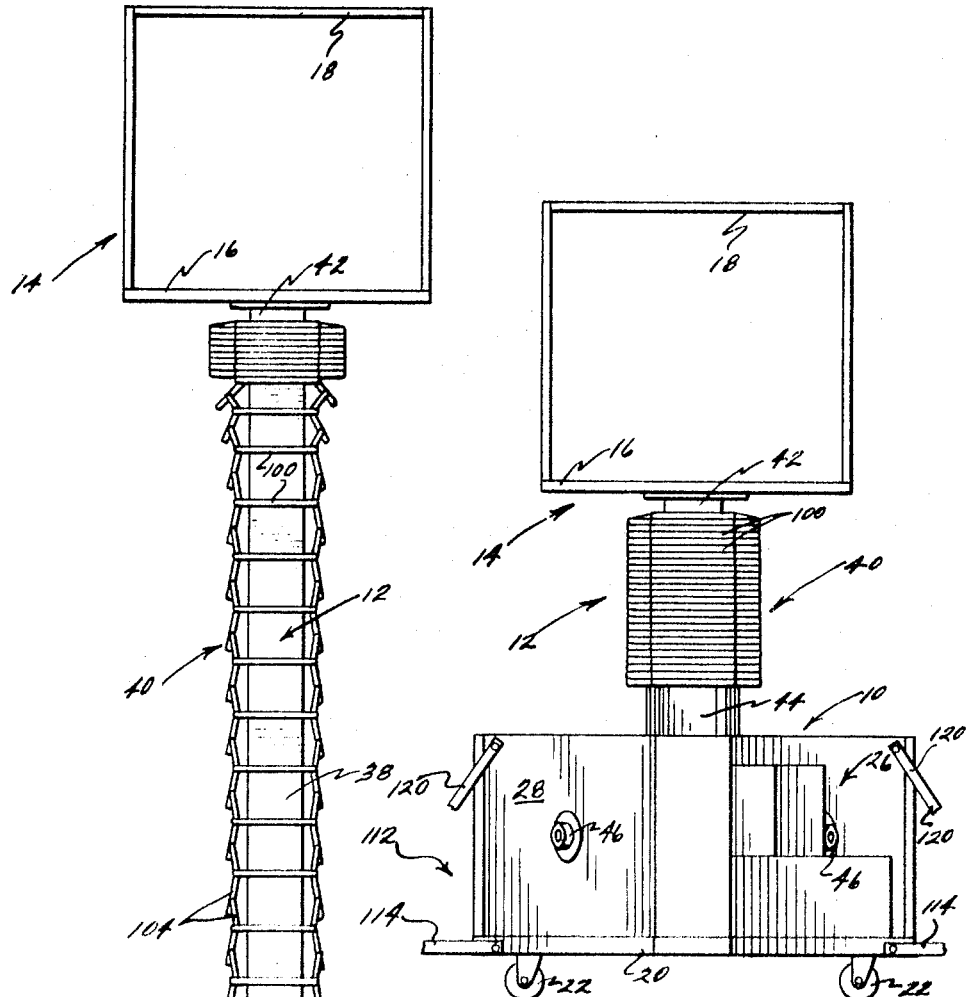
FIG. 2.
FIG. 1.
INVENTOR.
ROY H. STEIN
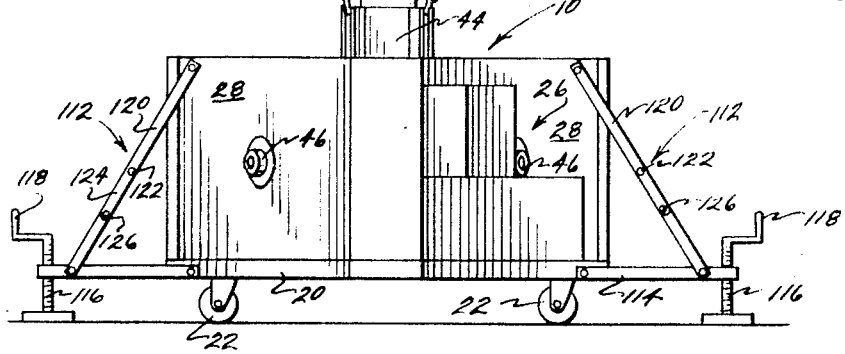
ATTORNEYS

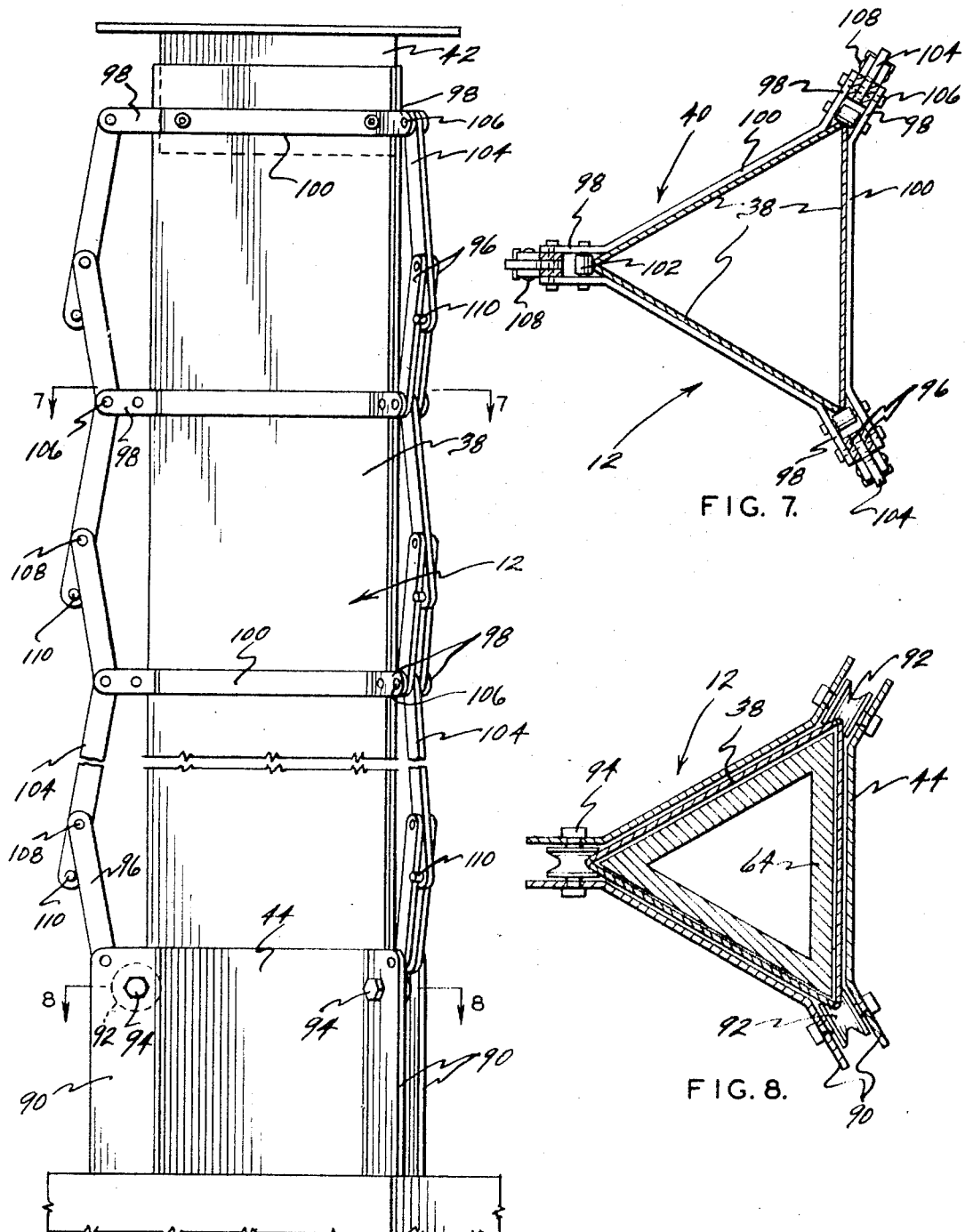

3,457,685
EXTENDABLE RIGID COLUMN ASSEMBLY
Roy H. Stein, 3920 Zephyr St., Wheatridge, Colo. 80033
Filed Aug. 7, 1967, Ser. No. 658,859
Int. Cl. E04h 12/18, 12/20; B65h 75/00
U.C. Cl. 52—108                                    7 Claims

ABSTRACT OF THE DISCLOSURE

This disclosure relates to an extendable rigid column formed by three coiled spring steel springs wound on reels spaced 120° apart. The springs are payed off the reels into a plurality of collapsible triangular retainers that hold the springs in equilateral triangular relation to form the rigid column. A single prime mover in the base operates through a train of bevel gears to turn the reels and extend and retract the springs simultaneously.

---

There are in common use a number of hoisting devices which can be employed to lift both men and other articles from the ground to an elevated position. Cranes, derricks and various kinds of elevators all fall within this generic classification of elevating devices; however, for low level work up to say 50 feet above ground level, by far the most common unit in current use is the so-called "cherry picker" which employs a hydraulically operated articulated arm or boom with a basket-like cab at the end thereof which contains the operating controls along with the operator himself. For the most part, these units are mounted on the bed of a large truck and, for this and other reasons, are extremely expensive and cumbersome. Public utilities and municipalities make extensive use of such units in the servicing of telephone wires, street lights, power transmission lines and the like; but the private businessman finds them too expensive, for the most part, for use in his operation.

The net result has been to try and develop a simpler and less expensive self-contained lifting mechanism based upon the principal of the retractable column. Telescoping tubes have proven unsatisfactory for this purpose because, if several sections are used, the smallest one is too flimsy to support much of a load; whereas, conversely, a two- or three-section unit becomes quite bulky if it is capable of being extended to even telephone pole height. The next approach seemed to be one of hinging rigid segments together in much the same manner as a tank tread and winding these tracks on reels to be payed off in the form of a rigid interlocked triangular column. While the prior art shows structures of this type, they have never enjoyed widespread acceptance, probably because of the expense of the tracks, the bulk of the reels upon which the tracks are wound, and the oversized and expensive prime mover necessary to push the latter up into column form.

The next major advance in this type of extendable column hoist came about when someone had the foresight to substitute wide steel coil springs for the hingedly interconnected segmented tracks of the prior art. These coils of spring steel had the considerable advantage of being lightweight, compact, strong and easy to handle while, at the same time, requiring considerably less power. Unfortunately, they also had certain disadvantages not present in the hinged track versions. Noteworthy among these disadvantages was the tendency of the springs to bend and recoil once wound off their respective reels, the latter admitting to a rather simple solution in the case of a hinged track by means of interlocking the adjoining edges and staggering the adjacent segments. The previous attempts to apply this interlocking edge technique to the springs such as by providing the edges thereof with staggered dovetail-shaped tongues and grooves have proven unworkable from a practical standpoint due to the extremely precise tolerances that have to be maintained in order that the interlock take place as intended. In addition, the absolute necessity for unwinding these three springs from their respective reels in very precise linear and lateral alignment with one another renders the mechanism for doing so extremely complicated and expensive.

It has now been found in accordance with the teaching of the instant invention that a much improved and simplified unit of this general type can be constructed which eliminates the interlocking edge feature along with its attendant difficulties and substitutes therefor a stack of hollow rectangular retaining members that are hingedly interconnected by pivoted links so that they can collapse and extend along with the column supported thereby. Needless to say, precise edge alignment is no longer critical and a very simple prime mover and bevel gear drive can be used to extend and retract the column along with its retaining members. In addition, these same triangular elements cooperate through their interconnecting links to provide a considerable measure of torsional stability that is difficult, if not impossible, to attain with interlocking edges.

Accordingly, it is the principal object of the present invention to provide a novel and improved extendable coil spring column hoist.

A second objective of the invention herein disclosed and claimed is the provision of a unique retaining means for keeping the springs in column form when extended as well as while they are being raised and lowered.

Another object is to provide a unit of the type aforementioned that contains a great simplified spring reel drive.

Still another objective is the provision of linked triangular column braces that offer substantial torsional stability to the column.

An additional object of the invention forming the subject matter hereof is to provide an extendable spring steel column hoist that has very modest power requirements that can be satisfied with a single small electric motor.

A further object is to provide an extendable column lifting device that is relatively inexpensive, compact, easy to operate, versatile, rugged, readily transportable from place to place, safe, efficient and easy to service.

Other objects will be in part apparent and in part pointed out specifically hereinafter in connection with the description of the drawings that follows, and in which:

FIGURE 1 is an elevational view showing the spring steel column hoist of the present invention partially extended;

FIGURE 2 is an elevational view similar to FIGURE 1 except that the column is fully retracted, the outrigger-type stabilizers having been broken off to conserve space;

FIGURE 6 is a considerably enlarged fragmentary elevation of the column and the retaining members therefore, portions having been broken away to conserve space;

FIGURE 7 is a horizontal section taken along line 7—7 of FIGURE 6; and,

FIGURE 8 is a horizontal section taken along line 8—8 of FIGURE 6.

Figure 3:
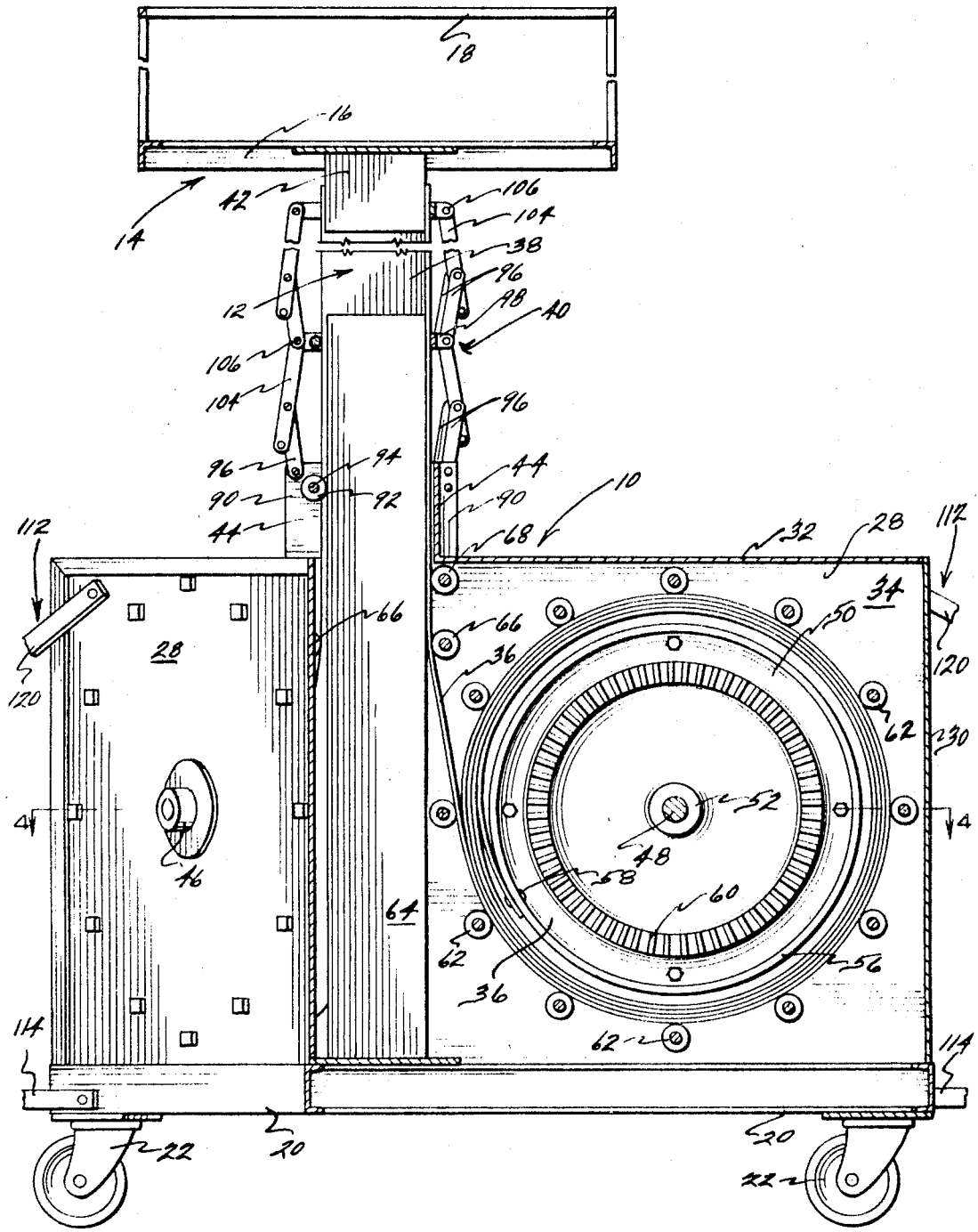
FIGURE 3 is a vertical section to an enlarged scale taken along line 3—3 of FIGURE 4 showing the details of the reel compartment, reel spring and drive for the latter, portions of the column having been broken away to conserve space.

Referring now to the drawings for a detailed description of the present invention and, initially, to FIGURES 1 and 2 for this purpose, reference numeral 10 has been employed to designate the reel cabinet broadly, reference numeral 12 to similarly designate the spring column that rises therefrom, and reference numeral 14 the load lifted by the hoist which, in the particular from shown, comprises a platform 16 having a guardrail 18 therearound designed to support a workman in an elevated position. Platform 16 can, of course, be used as a freight elevator to hoist materials rather than people or the load may consist of permanent items like floodlights, television and motion picture cameras together with their operators, if any. Equipment such as lights that can be remotely-operated should have the controls therefor as well as the hoist controls on the ground; whereas, when the equipment requires an operator or a man alone is hoisted by the apparatus, all controls should be available to him on the platform including those to raise and lower the hoist. Thus, the type of the load, whether human or inanimate or both, is immaterial to the present invention and the various control systems outlined above are well within the skill of the art depending upon the particular end use to which the hoist is adapted.

Reel cabinet 10 includes a base 20 supported upon three casters 22. This base is generally Y-shaped such that the stem portion together with the branched arms thereof are of equal length and intersect one another at an angle of 120° as is revealed most clearly in FIGURE 4. A triangular platform 24 that is also seen best in FIGURE 4 bridges the space between two arms of the base 20 and provides a support for the drive mechanism that has been indicated in a general way by numeral 26. Resting atop each arm of the base are upstanding rectangular box-like structures that include spaced parallel sidepanels 28, endwalls 30 and coverplates 32, all of which cooperate to define reel compartments 34 that house the spring reels 36 along with the coil springs 38 wound thereon. These springs 38 when unwound from their respective reels 36 emerge from the reel cabinet 10 at the center thereof and cooperate with one another to define the upstanding rigid column 12 which is guided and held in columnar form by a chain of interlinked collapsible retaining members that have been broadly referred to by reference numeral 40. The uppermost element of this chain is permanently fastened to the free ends of the springs 38 and the latter are, in turn, fastened to triangular member 42 projecting downwardly from the center of platform 16. The lowermost element of the chain is similarly fastened to the upper outside corners of the guideplates 44 which sit atop the reel cabinet 10 and guide the springs as they emerge therefrom.

Next, with reference to FIGURES 3, 4 and 5, the reel drive mechanism 26 will be described in detail. As previously mentioned, the reel compartments 34 extend radially out from a common center at angles of 120° to one another and each houses a reel 36. Shaft journals 46 are fastened to the outside of each sidepanel 28 at approximately the geometrical center thereof and shafts 48 are journaled for rotation therein. The reels 36 are, in the particular form shown, each made up from two peripherally flanged disks 50 that have a central hub 52 which fastens to the shaft 48 for conjoint rotation therewith. Pairs of these disks 50 are bolted together in back-to-back spaced relation with spacers 54 therebetween to form the reels. The peripheral flanges 56 encircling the disks cooperate with one another to define a cylindrical surface around which the springs coil. The inner end of each spring is fastened to these cooperating flanges of its reel as indicated in FIGURE 3 by reference numeral 58.

Flanged disks 50 come in two styles, one of which has an integrally formed beveled ring gear 60 located on its outside surface between the flange and hub thereof in concentric relation to both, while the other style which, for purposes of differentiating therebetween, has been designated 50m, is plain and contains no such gear. As the description proceeds, it will become obvious that all three of the reels can, if desired, be made up from two of the gear-carrying disks 50; however, two of the reels need only have one such disk and it becomes less expensive to eliminate the gear 60 from the other.

Figures 4, 5:
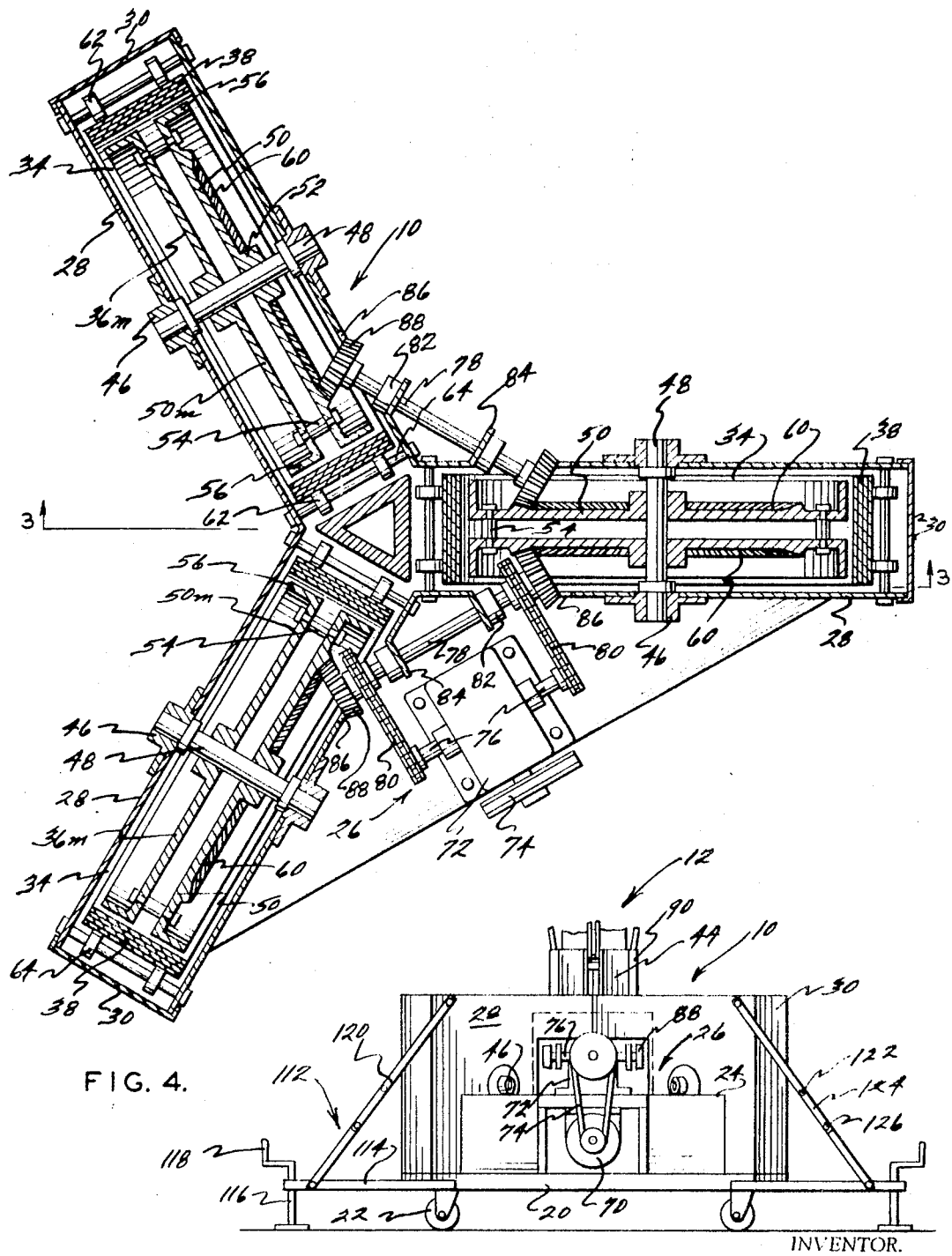
FIGURE 4 is a horizontal section taken along line 4—4 of FIGURE 3.
FIGURE 5 is a fragmentary elevational view to the same scale as FIGURES 1 and 2 and similar thereto except that it reveals the unit from a different angle so as to expose the drive mechanism.

As shown quite clearly in FIGURE 4, one of the two reels 36 connected directly to the reel drive 26 is made up from two identical gear-carrying disks 50, while the other reel 36m connected directly to the reel drive along with the third reel which is identical to the latter, each have one gear-carrying disk 50 mated with a plain disk 50 m. It is, perhaps, also appropriate to mention at this point that a series of roller idlers 62 are mounted within each reel compartment in angularly spaced relation around the outside of each reel spaced radially beyond the flanges thereof a distance sufficient to receive the fully coiled spring therebetween. The set of spring 38 is such that it tends to uncoil from the reel so that it is actually maintained coiled by the idlers inside of which it rolls as shown most clearly in FIGURE 3. The free end of each spring emerges from its reel between two of the idlers nearest triangular centerpost 64 where two more sets of idlers 66 and 68 (FIGURE 3) hold same against one of the flat faces of the centerpost.

Specifically referring to FIGURES 4 and 5, a reversible electric motor 70 is hung from the underside of elevated platform 24 atop which sits a conventional double-ended right angle gear reducer 72. The output shaft of the motor is connected in driving relation to the input shaft of the reducer by a conventional belt-and-pulley power transfer mechanism 74. Double-ended output shaft 76 of the reducer is connected in driving relation to a parallel double-ended shaft 78 by a pair of chain and sprocket drives 80. It is, of course, obvious that the reducer need only have a single-ended output shaft with a single chain and sprocket drive operatively interconnecting it with the driven shaft 78; however, the arrangement shown is preferred from the standpoint of good mechanical design.

Shaft 78 is journaled for rotation within bearings 82 that are mounted upon ears 84 bent out from sideplates 28 of the reel cabinet. These ears leave openings 86 in the sideplates through which the bevel gears 88 on the opposite ends of shaft 78 enter the reel compartment to mesh with the ring gears 60 formed on the disks 50. Thus, reel 36 to the right in FIGURE 3 of the reel drive as well as reel 36m to the left thereof are driven in the same direction more or less directly while the third reel 36m in the upper left corner derives its power from reel 36. As illustrated in FIGURE 3, a second shaft and bevel gear subassembly 78, 88 is provided between reel 36 and the third reel 36m to form a driving connection therebetween. A similar driving connection between the two reels to the left in FIGURE 3 could easily be provided by replacing disks 50m with gear-carrying disks 50 and adding a third shaft and bevel gear subassembly 78, 88; however, no advantage has been found thus far from adding same and it obviously makes the unit more expensive. In fact, the unit will operate quite satisfactorily if only the two reels adjacent the reel drive are driven allowing the springs thereof to carry the spring of the third up and down the column. In that all three springs are connected to a common support, namely, member 42 on the underside of platform 16, driving any one of the three reels will suffice to raise and lower the column although the better practice is to drive all three as shown. Note that the gearing is such that all three reels turn in the same direction and at the same speed due to the positive mechanical coupling therebetween.

In FIGURES 6, 7 and 8 to which reference will now be made, it will be seen that the three springs 38 are initially guided off their respective reels into column-forming relation by guideplates 44 and centerpost 64, both of which are shown in FIGURE 8. Centerpost 64 is hollow so as to permit the platform and column-control wires to pass down therethrough. It has an equilateral triangular cross section and projects upwardly above the top of the reel cabinet approximately the same distance as that occupied by the retaining members 40 when in the collapsed position shown in FIGURE 2.

Spaced outwardly of the faces of the centerpost 64 a distance slightly greater than the thickness of the springs 38 are the inside surfaces of the guideplates 44 which mount atop the reel cabinet over the triangular opening in the center thereof. These guideplates have their side margins bent out into spaced parallel relation with one another so as to form flanges 90 adapted to receive grooved rollers 92 therebetween on stub shafts 94. Rollers 92 engage the adjacent edges of the springs 38 as they emerge from the reel cabinet so as to prevent them from assuming an overlapped relation. Also fastened between the flanges of the guideplates above the rollers 92 for pivotal movement about a horizontal axis paralleling the spring remote therefrom are three pairs of parallel links 96. Three identical pairs of links 96 are also pivotally attached between the outturned parallel ears 98 of triangular retainers 100 for movement about horizontal axes paralleling the spring remote thereto. Retainers 100 are shaped almost exactly like the guideplates 44 when seen in plan view as evidenced by comparing FIGURES 7 and 8, the prime difference therebetween lying in the greatly reduced height of the retainers which permits them to collapse one atop the other and form a compact stack such as has been illustrated in FIGURE 2. Instead of grooved rollers 92, small cylindrical rollers 102 are mounted for rotation between the parallel flanges 98 of the retainers in position to engage the edges of the springs.

Between the two links 96 forming the pairs thereof is a single link 104 mounted upon a common pivot 106. Links 104 extend downwardly where they are pivotally attached intermediate the ends thereof between the upper ends of the links 96 that extend upwardly from the retainer immediately therebeneath. The pivot pins 108 located between the retainers 100 are located midway between the pivots 106 immediately above and below so that links 104 will fold into links 96 as indicated near the top of the column in FIGURE 1. A portion of each link 104 extends beneath its pivot 106 and is provided with a stop pin 110 that engages the edges of the paired links 96 and keeps them always partially folded. Otherwise, these links would move into a straight-line relation where they might fold inwardly against the column or shear off the pivot pins. The uppermost retainer 100 is fastened to the triangular plug 42 through the spring ends.

Now, starting with the springs fully retracted as in FIGURE 2, the retainers will, one-by-one, move off the bottom of the stack thereof while the column is being extended as shown in FIGURE 1. Each retainer closely engages one of the springs and, along with edge-engaging rollers 102, cooperates to hold said springs in a true equilateral triangular relation. In addition, while the pivotally linked connections between the retainers permit some twist to take place therebetween, they prevent any major torsional deflection in the column, the latter being a serious deficiency of the prior art designs. As the column is retracted, a new stack of retaining elements is formed at the base of the column with the retainers being added one at a time to the top thereof except for those remaining in stacked relation as in FIGURE 1 at the upper end of the column which are added last.

Finally, with reference to FIGURES 1 and 5, it will be seen that the reel cabinet is equipped with foldable outrigger subassemblies that have been broadly indicated by reference numeral 112 and which function to both stabilize and level the unit. These outriggers project out radially from each of the reel compartments and they each include a horizontal member 114 pivotally attached to the reel cabinet frame so that it can be raised into vertical folded position up along side the sidewall 30 of the adjacent reel compartment. The free end of member 114 is threaded to receive a screw-type foot 116 with a crank 118 atop thereof which, when screwed down, will raise the casters 22 free of the ground and, in cooperation with the two other such feet, permit the cabinet to be leveled. Foldable strut 120 pivotally attached to the reel cabinet near the top thereof and to member 114 adjacent foot 116 provides the structure necessary to brace the outrigger. Strut 120 is formed in two parts pivotally interconnected at 122. One section of the strut has a portion 124 projecting beyond the pivot and registering holes through the overlapped portions receive a lock pin 126 that holds the strut rigid. When the unit is transported from place to place, the outriggers are folded up out of the way.

Having thus described the several useful and novel features of the extendable rigid column of the present invention, it will be seen that the many worthwhile objectives for which it was developed have been achieved. Although but a single specific embodiment of the invention has been disclosed herein, I realize that certain changes and modifications therein may well occur to those skilled in the art within the broad teaching hereof.

What is claimed is:

1. The extendable rigid column hoist which comprises: a ground-supported reel cabinet which includes three vertically disposed reel compartment projecting outward radially from a triangular central opening in equiangularly spaced relation to one another; a reel mounted for rotation in each of the reel compartments about a horizontal axis extending transversely thereof; a coil spring of substantial length and width wound upon each reel with one end attached thereto and its free end emerging from the central opening in the cabinet, the free ends of said springs cooperating with one another in edge-to-edge relation to form an upstanding rigid column projecting above said cabinet that has an equilateral triangular cross section; a stack of horizontally disposed parallel retaining members enveloping the column emerging from the cabinet, each of said retaining members having a three-cornered opening therein with its corners in continual engagement with the corresponding corners of the column so as to maintain same in edge-to-edge triangular form, the topmost retaining member of the stack thereof being fastened to the free ends of the springs while the bottommost retainer is fastened to the cabinet independent of said springs; foldable pivotally interconnected links pivotally connected to the corresponding corners of adjacent retaining members to form an extendable interlinked chain thereof, said links being operative upon extension of the column to unfold and pull the retaining members one at a time off the bottom of the stack thereof while maintaining the parallel relation therebetween, and said links being operative upon retraction of said column to fold and replace said retaining members on top of a new stack at the base of the column commencing with the lowermost retaining member; reversible drive means; and, a drive train operatively interconnecting the reversible drive means with at least one of the reels, said drive means and drive train cooperating upon actuation to turn all three reels in the same direction and at the same speed so as to extend and retract the column.

2. The extendable rigid column hoist as set forth in claim 1 in which: the foldable pivotally interconnected links include a pair of spaced parallel links and a single link pivotally connected between said parallel links.

3. The extendable rigid column hoist as set forth in claim 1 in which: each retaining member has outturned spaced parallel ears at each corner of the three-cornered opening therein extending outward radially therefrom; and, in which rollers are journaled for rotation in the corners of said three-cornered opening in position to roll along the adjacent edges of the springs and maintain same in edge-to-edge contacting relation.

4. The extendable rigid column hoist as set forth in claim 1 in which: the drive train includes a gear reducer having an input shaft connected in driving relation to the drive means and an output shaft, at least one bevel gear on the output shaft, and a ring-type bevel gear on one of the spring reels positioned and adapted to form a driving connection with the bevel gear on the reducer output shaft.

5. The extendable rigid column hoist as set forth in claim 2 in which: the single link is pivotally connected at a point intermediate the ends thereof to the pair of parallel links; and, a stop pin is provided on that portion of the single link projecting beyond the pivotal connection between the parallel links, said stop pin being adapted to engage said parallel links and prevent the pivotal connection therebetween from moving into straight-line relation with the pivotal connections between said links and their respective retaining members.

6. The extendable rigid column hoist as set forth in claim 4 in which: the gear reducer has a double-ended output shaft, a second bevel gear is mounted on the other end of said double-ended output shaft, and a second ring-type bevel gear is mounted on another of the reels in position to form a driving connection with said second bevel gear.

7. The extendable rigid column hoist as set forth in claim 6 in which: the third reel carries a third ring-type bevel gear, a fourth ring-type bevel gear is mounted on the opposite side of one of the reels already equipped with a ring-type bevel gear, and a shaft with bevel gears on opposite ends thereof mating with the third and fourth ring-type bevel gears to form a driving connection therebetween is journaled for rotation between said third and fourth ring-type bevel gears.

References Cited

UNITED STATES PATENTS

| 2,130,993 | 9/1938 | Dubilier | 52—108 |
| 2,269,364 | 1/1942 | Farrand | 182—41 |
| 2,299,687 | 10/1942 | Farrand | 52—108 |
| 2,661,082 | 12/1953 | Ziegler | 52—108 |
| 3,242,576 | 3/1966 | Wheeler | 52—108 |

HENRY C. SUTHERLAND, Primary Examiner

U.S. Cl. X.R.

182—41; 242—54